United States Patent
Quine

(10) Patent No.: US 12,455,047 B2
(45) Date of Patent: Oct. 28, 2025

(54) CRYOGENIC STORAGE SYSTEM

(71) Applicant: New Energy Development Company, Katy, TX (US)

(72) Inventor: Thomas G. Quine, Methuen, MA (US)

(73) Assignee: New Energy Development Company, Katy, TX (US)

( * ) Notice: Subject to any disclaimer, the term of this patent is extended or adjusted under 35 U.S.C. 154(b) by 497 days.

(21) Appl. No.: 17/323,622

(22) Filed: May 18, 2021

(65) Prior Publication Data

US 2022/0373136 A1 Nov. 24, 2022

(51) Int. Cl.
F17C 7/02 (2006.01)
F17C 13/04 (2006.01)

(52) U.S. Cl.
CPC ............... F17C 7/02 (2013.01); F17C 13/04 (2013.01); F17C 2223/0161 (2013.01); F17C 2225/0161 (2013.01); F17C 2225/033 (2013.01); F17C 2227/0107 (2013.01); F17C 2227/0388 (2013.01); F17C 2250/01 (2013.01)

(58) Field of Classification Search
CPC .... F17C 7/02; F17C 13/04; F17C 2223/0161; F17C 2225/0161; F17C 2225/033; F17C 2227/0107; F17C 2227/0388; F17C 2250/01; F17C 2201/0109; F17C 2201/035; F17C 2201/054; F17C 2203/0391; F17C 2203/0629; F17C 2203/0639; F17C 2203/0648; F17C 2203/0675; F17C 2205/0326; F17C 2205/0332; F17C 2221/011; F17C 2221/012; F17C 2221/014; F17C 2221/033; F17C 2223/033; F17C 2223/035; F17C 2227/0311; F17C 2227/0393; F17C 2250/032; F17C 2250/0408; F17C 2265/063; F17C 2265/065; Y02E 60/32
See application file for complete search history.

(56) References Cited

U.S. PATENT DOCUMENTS

| | | | | |
|---|---|---|---|---|
| 5,505,232 A | * | 4/1996 | Barclay | F25J 1/0245 141/82 |
| 5,682,750 A | * | 11/1997 | Preston | F17C 9/00 62/911 |
| 6,474,101 B1 | | 11/2002 | Quine et al. | |
| 7,293,417 B2 | * | 11/2007 | Baudat | F17C 9/04 62/50.1 |

(Continued)

*Primary Examiner* — Joel M Attey
*Assistant Examiner* — Ibrahim A. Michael Adeniji
(74) *Attorney, Agent, or Firm* — Global IP Counselors LLP; David Tarnoff

(57) ABSTRACT

A cryogenic storage system basically includes a first cryogenic storage tank, a second cryogenic storage tank, a fluid transfer line and a cryogenic containment structure. The first cryogenic storage tank has a first predetermined capacity of liquefied gas. The second cryogenic storage tank has a penetration free bottom and a second predetermined capacity of the liquefied gas that is larger than the first predetermined capacity of the first cryogenic storage tank. The fluid transfer line is fluidly connected between the first cryogenic storage tank and the second cryogenic storage tank. The heat exchanger converts liquid exiting the first cryogenic storage tank to a higher pressure gas that is used as a motive force to move liquidized gas out of the second cryogenic storage.

19 Claims, 2 Drawing Sheets

(56) References Cited

U.S. PATENT DOCUMENTS

| | | | |
|---|---|---|---|
| 2013/0263609 A1* | 10/2013 | Mackey | F17C 13/02 137/334 |
| 2015/0027136 A1* | 1/2015 | Desjardins | F17C 7/02 62/50.7 |
| 2022/0349526 A1* | 11/2022 | Kubica | F17C 3/08 |

* cited by examiner

CRYOGENIC STORAGE SYSTEM

BACKGROUND

Technical Field

This disclosure generally relates to a cryogenic storage system. More specifically, the present disclosure relates to a cryogenic storage system that safely stores and dispenses cryogenic liquid gas (LG).

Background Information

In view the concerns of environmental pollution and global warming, a number of proposals have been presented by the energy industry to reduce carbon dioxide emissions that result from the use of fossil fuels. Intermittent renewables offer de-carbonization gains yet they are intermittent. Energy storage coupled with intermittent renewables are needed to allow for 24 hour and 7 day a week of available energy. This decarbonization of the energy industry has created the need for complete system solutions relating to the production, storage and dispensing of industrial gases as cleaner forms of fuels such as natural gas, hydrogen, nitrogen, oxygen and other industrial gases. Generally, storage of industrial gases such as hydrogen and natural gas take place with the gas in the form a liquid (i.e., the liquefied gas) or high-pressure vapor. There is much more storage density in the liquid phase. As a result, storage facilities have been built to store and dispense the industrial gases as liquefied gas (LG). Cryogenic storage tanks are often designed with a primary cryogenic containment and a secondary cryogenic containment to reduce a thermal radiation exclusion zone and vapor dispersion zone in the case of a cryogenic spill from the cryogenic storage tank. Typically, the cryogenic containment is designed to contain a 100% liquid design spill.

SUMMARY

Generally, the present disclosure is directed to various features of a cryogenic storage system for safely storing and dispensing cryogenic liquid gas (LG). More specifically, the cryogenic storage system of the present disclosure relates is configured to safely store and dispense cryogenic liquid gas using a double cryogenic wall tank storage system without bottom penetrations and with no internal liquid pumps needed.

With the cryogenic storage system according to the above mentioned aspect, it is possible to provide a cryogenic storage system that does not need a large containment structure.

One object of the present disclosure is to provide a cryogenic storage system having a cryogenic storage tank that without an internal pumps or any bottom penetrations.

Another object of the present disclosure is to provide a cryogenic storage system that does not rely on an internal liquid pump for dispensing cryogenic liquid gas.

In view of the state of the known technology and in accordance with one aspect of the present disclosure, a cryogenic storage system is provided that basically comprises a first cryogenic storage tank, a second cryogenic storage tank, a fluid transfer line and a cryogenic containment structure. The first cryogenic storage tank has a first predetermined capacity of liquefied gas. The second cryogenic storage tank has a penetration free bottom and a second predetermined capacity of the liquefied gas that is larger than the first predetermined capacity of the first cryogenic storage tank. The fluid transfer line is fluidly connected between the first cryogenic storage tank and the second cryogenic storage tank. The heat exchanger converts liquid exiting the first cryogenic storage tank to a higher pressure gas that is used as a motive force to move liquidized gas out of the second cryogenic storage.

With the cryogenic storage system according to the above mentioned aspect, it is possible to provide a cryogenic storage system that does not need a large containment structure.

Also, with the cryogenic storage system according to the above mentioned aspect, it is possible to provide a cryogenic storage system that relies on double cryogenic walls for containment of design spills of the larger cryogenic storage tank(s).

Generally, the cryogenic storage system of the present disclosure relates to a mechanical batch process created to provide a safer storage and transfer of cryogenic liquids that enhances the decarbonization goals of the United States. The cryogenic storage system of the present disclosure can be applied to all cryogenic liquid storage applications.

Also, other objects, features, aspects and advantages of the disclosed cryogenic storage system will become apparent to those skilled in the art from the following detailed description, which, taken in conjunction with the annexed drawings, discloses preferred embodiments of the cryogenic storage system.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the cryogenic liquid gas field from this disclosure that the following descriptions of the embodiments are provided for illustration only and not for the purpose of limiting the invention as defined by the appended claims and their equivalents.

Figure 1:
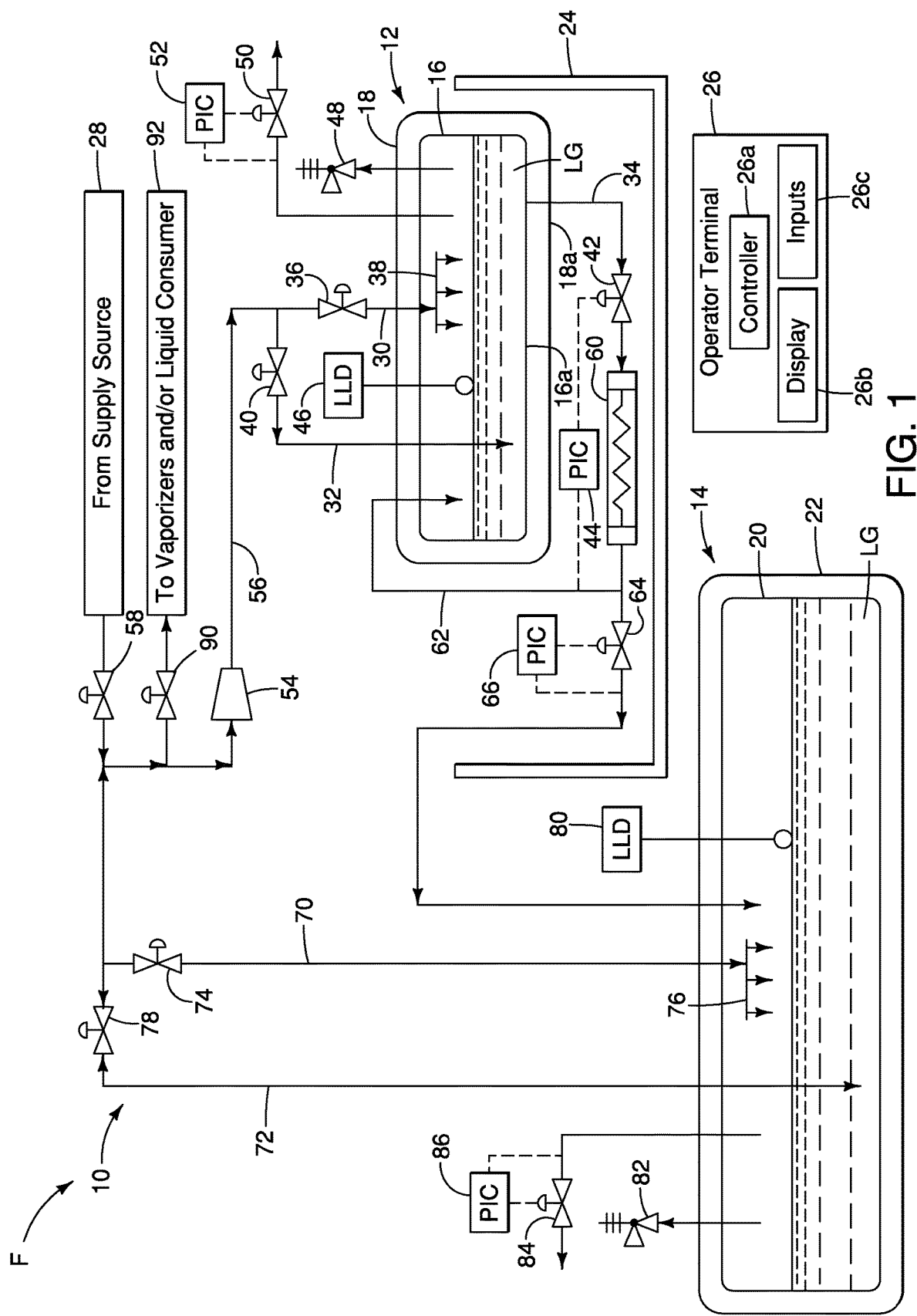
FIG. 1 is a schematic illustration of a cryogenic storage facility having a cryogenic storage system in accordance with a first embodiment.

Referring to FIG. 1, a cryogenic storage system 10 is schematically illustrated in accordance with a first embodiment. The cryogenic storage system 10 can be a part of an industrial gas storage and dispensing facility F that is designed to receive produce and/or receive liquefied gas LG from LG transport vehicles, and dispense the liquefied gas (LG) to other LG transport vehicles.

The cryogenic storage system 10 basically comprises a first cryogenic storage tank 12 and a second cryogenic storage tank 14. The first cryogenic storage tank 12 and the second cryogenic storage tank 14 both contain the same liquefied gas LG. The first cryogenic storage tank 12 and the second cryogenic storage tank 14 are configured to contain the liquefied gas LG at low temperatures so that gas remains in liquid form. The construction and materials for the first cryogenic storage tank 12 and the second cryogenic storage tank 14 depend on the type of liquefied gas LG being contained in the cryogenic storage system 10.

As explained below, the liquefied gas LG contained in the second cryogenic storage tank 14 is dispensed by vaporizing the liquefied gas LG contained in the first cryogenic storage tank 12, and then using the higher pressure of the vaporized gas from the first cryogenic storage tank 12 as a motive force to move the liquefied gas LG out of the second cryogenic storage 14. In the illustrated embodiment, the first cryogenic storage tank 12 has a bottom penetration for transferring the liquefied gas LG contained in the first cryogenic storage tank 12 to the second cryogenic storage tank 14. On the other hand, the second cryogenic storage 14 does not have a bottom penetration. Thus, the liquefied gas LG contained in the second cryogenic storage tank 14 is dispensed from the top of the second cryogenic storage tank 14.

The first cryogenic storage tank 12 has a first predetermined capacity, while the second cryogenic storage tank 14 has a second predetermined capacity that is larger than the first predetermined capacity of the first cryogenic storage tank 12. In the illustrated embodiment, for example, the first cryogenic storage tank 12 has a capacity of approximately 10,000 US gallons. The first cryogenic storage tank 12 includes an inner container 16 and an outer container 18. The inner container 16 is disposed inside of the outer container 18 to form a double walled cryogenic storage tank. The outer container 18 of the first cryogenic storage tank 12 provides a carbon steel vacuum jacket and insulation to minimize heat transfer to the inner container 16. The liquefied gas LG is normally stored in the inner container 16 the first cryogenic storage tank 12 at an operating pressure of between 15 psig to 250 psig and at a temperature that will maintain the liquefied gas LG in a liquid state.

Also, in the illustrated embodiment, for example, the second cryogenic storage 14 has a capacity of approximately 60,000 US gallons to 5 million US gallons. Of course, the capacity of second cryogenic storage 14 can be smaller or larger as needed and/or desired. The second cryogenic storage 14 includes an inner container 20 and an outer container 22. The inner container 20 is disposed inside of the outer container 22 to form a double walled cryogenic storage tank. The outer container 22 of the second cryogenic storage 14 provides a carbon steel vacuum jacket and insulation to minimize heat transfer to the inner container 20.

The inner container 16 of the first cryogenic storage tank 12 and the inner container 20 of the second cryogenic storage 14 are made of suitable material to handle the specific liquefied gas being stored. For gases that are liquid at −100° C. such propane and carbon dioxide, suitable materials for the inner container 16 and the outer container 18 include low carbon steel with a nickel content of 3.5%, aluminum alloys, nickel alloys, and titanium alloys. For gases that that are liquid at −196° C. such as natural gas (methane), oxygen and nitrogen, suitable materials for the inner container 16 and the outer container 18 include 300 series austenitic stainless steels, steels with a nickel content between 20% and 25%, cobalt alloys, molybdenum alloys, titanium alloys, aluminum alloys, and niobium alloys. For gases that that are liquid below −196° C. such as hydrogen and helium, suitable materials for the inner container 16 and the outer container 18 include high-alloy austenitic stainless steels that contain between 18% and 21% chromium and between 9% and 14% nickel.

The liquefied gas LG is normally stored in the inner container 20 of the second cryogenic storage 14 at an operating pressure of between 15 psig to 250 psig and at a temperature that will maintain the liquefied gas LG in a liquid state. However, the liquefied gas LG of the first cryogenic storage tank 12 is maintained at a higher pressure than the second cryogenic storage 14. For example, in the illustrated embodiment, the liquefied gas LG of the first cryogenic storage tank 12 is maintained at 100 psig, while the liquefied gas LG of the second cryogenic storage 14 is maintained at 80 psig. In this way, the pressure of the liquefied gas LG of the second cryogenic storage 14 can be supplied to the first cryogenic storage tank 12 as a motive force to move the liquefied gas LG out of the second cryogenic storage 14.

It is also possible to have the pressure of the liquefied gas LG of the first cryogenic storage tank 12 equal to the pressure of the second cryogenic storage 14 if the elevation of the first cryogenic storage tank 12 is sufficient higher than the second cryogenic storage 14. In this way, gravity can be used a motive force for moving the liquefied gas LG out of the second cryogenic storage 14.

With the above mentioned configuration, the cryogenic storage system 10 further includes a cryogenic containment structure 24. The cryogenic containment structure 24 is positioned to contain spillage from the first cryogenic storage tank 12. Here, the cryogenic containment structure 24 is illustrated as a cryogenic containment container that is located beneath the first cryogenic storage tank 12. However, the cryogenic containment structure 24 is not limited to the illustrated containment container. The cryogenic containment structure 24 can be any type of know cryogenic containment structure including, but not limited to liquid-tight storage cabinets, berms, curbs, sills, sunken floors, special liners, drip pans, drip buckets, tanks, or other structures. The cryogenic containment structure 24 can be purchased as a ready-made unit or custom built on site. Preferably, the cryogenic containment structure 24 has a containment capacity that is equal to or greater than the first predetermined capacity of the first cryogenic storage tank 12. More preferably, the cryogenic containment structure 24 has a containment capacity that is at least 110% of the first predetermined capacity of the first cryogenic storage tank 12. Even more preferably, the cryogenic containment structure 24 has a containment capacity that is at least 150% of the first predetermined capacity of the first cryogenic storage tank 12. However, the cryogenic containment structure 24 could have a containment capacity that is equal to or greater than a maximum fill level (90% of the first predetermined capacity) of the first cryogenic storage tank 12.

Also, with the above mentioned configuration, the second cryogenic storage tank 14 has no bottom penetrations. As a result, the cryogenic storage system 10 does not need a secondary cryogenic containment structure for contain spillage from the second cryogenic storage tank 14. Moreover, the second cryogenic storage tank 14 does not have use an internal pumps or compressor to dispense the liquefied gas LG out of the second cryogenic storage 14. Rather, the cryogenic storage system 10 converts the higher pressure liquefied gas LG from the first cryogenic storage tank 12 (i.e., the smaller cryogenic storage tank) to vapor that is transferred to the second cryogenic storage tank 14 (i.e., the larger cryogenic storage tank) as a motive force to move the liquid out of the second cryogenic storage tank 14 without bottom penetrations and without the use of pumps or compressors. Thus, the first cryogenic storage tank 12 (i.e., the smaller cryogenic storage tank) can have bottom penetrations and a pressure build component. In this way, the first cryogenic storage tank 12 is used as a smaller sacrificial tank for the second cryogenic storage tank 14, which is a larger cryogenic storage tank.

The cryogenic storage system 10 further comprises an operator terminal 26 for controlling the storage of the liquefied gas LG in the first cryogenic storage tank 12 and the second cryogenic storage tank 14, as well as the dispensing of the liquefied gas LG from the second cryogenic storage tank 14. The operator terminal 26 is basically a computer terminal that includes an electronic controller 26a, a display 26b and a plurality of user inputs 26c. The operator terminal 26 is preferably a part of a supervisory control and data acquisition (SCADA) system in which the operator terminal 26 is a remote terminal unit (RTU). The electronic controller 26a is a programmable logic controller (PLC) that is preferably includes a microcomputer or central processing unit (CPU), at least one processor and at least one computer storage device (i.e., computer memory devices). The term "electronic controller" as used herein refers to hardware that executes a software program, and does not include a human. The electronic controller 26a typically include some or more printed circuit boards (PCB) containing any number of integrated circuit or circuits for completing the activities described herein. The electronic controller 26a can be be one or more integrated circuits having firmware for causing the circuitry to complete the activities described herein. Of course, any number of other analog and/or digital components capable of performing the below described functionality can be provided in place of, or in conjunction with the below described controller elements. The display 26b includes a display screen for displaying the operations carried out by the user. The user inputs 26c are conventional user operable input devices, and can include, for example, a keyboard, a mouse, a joystick, a button, a switch, a lever, a dial and/or a touch screen.

The first cryogenic storage tank 12 and the second cryogenic storage tank 14 are configured to receive liquefied gas LG from a supply source 28. The supply source 28 can be from an onsite liquefaction system and/or a LG transport which can be over the road, rail or marine. The liquefied gas LG from the supply source 28 can be liquid hydrogen, liquid natural gas, liquid oxygen, liquid nitrogen, etc.

The first cryogenic storage tank 12 will now be discussed in more detail. The first cryogenic storage tank 12 has a top fill inlet line 30, a bottom fill inlet line 32 and an outlet line 34. The outlet line 34 is provided in the bottom (i.e., the lower half of the first cryogenic storage tank 12). Thus, the first cryogenic storage tank 12 includes a bottom penetration for the outlet line 34 that extends a bottom 16a of the inner container 16 and a bottom 18a the outer container 18. The outlet line 34 is fluidly connected to the second cryogenic storage tank 14. The outlet line 34 is fluidly connected to the top of the second cryogenic storage tank 14 so that the second cryogenic storage tank 14 does not have a bottom penetration. Thus, the outlet line 34 constitutes a fluid transfer line for transferring vapor from the first cryogenic storage tank 12 to the second cryogenic storage tank 14. In this way, the vapor from the first cryogenic storage tank 12 is used as a motive force to move the liquefied gas LG out of the second cryogenic storage tank 14 without the second cryogenic storage tank 14 having any bottom penetrations and without the use of pumps or compressors.

With this arrangement, the first cryogenic storage tank 12 can be filled with the liquefied gas LG at a top region (upper half) of the first cryogenic storage tank 12 using the top fill inlet line 30, and a bottom region (lower half) of the first cryogenic storage tank 12 using the bottom fill inlet line 32. This top and bottom filling of the first cryogenic storage tank 12 with the liquefied gas LG promotes mixing of the liquefied gas LG in the first cryogenic storage tank 12. Also, the pressure of the liquefied gas LG in the first cryogenic storage tank 12 can be managed better by filling the first cryogenic storage tank 12 with the liquefied gas LG from both the top and bottom regions of the first cryogenic storage tank 12.

The top fill inlet line 30 is provided with an on/off control valve 36 for controlling the supply of the liquefied gas LG to the top region of the first cryogenic storage tank 12. Here, the top fill inlet line 30 is also provided with a spray bar 38 to promote mixing of the liquefied gas LG in the first cryogenic storage tank 12. Similarly, the bottom fill inlet line 32 is provided with an on/off control valve 40 for controlling the supply of the liquefied gas LG to the bottom region of the first cryogenic storage tank 12. The outlet line 34 is provided with an on/off control valve 42 for controlling the liquefied gas LG being removed from the first cryogenic storage tank 12. The on/off control valve 42 is pressure feedback controlled by a pressure controller 44. The pressure controller 44 opens the on/off control valve 42 when the pressure in the outlet line 34 downstream of the on/off control valve 42 falls below the predetermined pressure (e.g., 80 psig) of the first cryogenic storage tank 12.

The on/off control valves 36, 40 and 42 are operatively coupled to the electronic controller 26a for automatically controlling the on/off control valves 36, 40 and 42 for refilling the first cryogenic storage tank 12 and maintaining the predetermined operating pressure of the first cryogenic storage tank 12. The on/off control valves 36, 40 and 42 are conventional valves that can be either manually operated or automatically operated. Since on/off control valves such as the on/off control valves 36, 40 and 42 are well known in the cryogenic field, the on/off control valves 36, 40 and 42 will not be discussed and/or illustrated herein. For example, the on/off control valves 36, 40 and 42 can be solenoid valve that are spring biased to a closed position, and then energized to an open position. Alternatively, the on/off control valves 36, 40 and 42 can be pressure controlled, instead energized by electricity.

Also, the first cryogenic storage tank 12 also includes a liquid level detector 46. The term "detector" as used herein refers to a hardware device or instrument designed to detect the presence or absence of a particular event, object, substance, or a change in its environment, and to emit a signal in response. The term "detector" as used herein do not include a human. The liquid level detector 46 indicates a level of the liquefied gas LG within the first cryogenic storage tank 12. Preferably, when the liquid level detector 46 indicates that the first cryogenic storage tank 12 has been filled to a predetermined level (e.g., a 90% maximum capacity), this will be communicated to the electronic controller 26a which will cause the on/off control valves 36 and 40 to be closed during a filling process. Thus, the liquefied gas LG located within the first cryogenic storage tank 12 is now isolated at the predetermined pressure and temperature. Alternatively, when the liquid level detector 46 indicates that the first cryogenic storage tank 12 has been fallen below to a predetermined level (e.g., an 80% maximum capacity), this will be communicated to the electronic controller 26a which will cause the on/off control valves 36 and 40 to be opened so as to be refilled with the liquefied gas LG from the second cryogenic storage tank 14. The liquid level detector 46 is preferably a conventional device that is well known in the cryogenic field. Thus, the liquid level detector 46 will not be discussed and/or illustrated in detail herein. The liquid level detector 46 is operatively coupled to the electronic controller 26a for automatically controlling the on/off control valves 36 and 40 for refilling the first cryogenic storage tank 12.

Also, the first cryogenic storage tank 12 also includes a pressure safety valve 48 that is configured to release pressure inside of the first cryogenic storage tank 12 in the event of the pressure becoming higher than a predetermined maximum pressure. Basically, the pressure safety valve 48 is a pressure relief valve that vents out the vapor in the first cryogenic storage tank 12 in the event of the pressure becoming higher than the predetermined maximum pressure. Since pressure safety valves such as the pressure safety valve 48 is well known in the cryogenic field, the pressure safety valve 48 will not be discussed and/or illustrated herein.

Also, the first cryogenic storage tank 12 also includes a boil off valve 50 that is pressure feedback controlled by a pressure controller 52. Since the boil off valve 50 such as the boil off valve is well known in the cryogenic field, the boil off valve 48 will not be discussed and/or illustrated herein.

Also, in the illustrated embodiment, the cryogenic storage system 10 further comprises an external compressor 54. The external compressor 54 is operatively coupled to the electronic controller 26a for automatically controlling the external compressor 54 as needed. The external compressor 54 is provided in an infeed line 56 that is fluidly connected to the top fill inlet line 30 and the bottom fill inlet line 32. The external compressor 54 is provided to increase the pressure of the first cryogenic storage tank 12 to the desired operating pressure. The infeed line 56 is fluidly connected to the second cryogenic storage tank 14 and the supply source 28. The inlet of the infeed line 56 is provided with an on/off control valve 58 for opening and closing the inlet of the infeed line 56. The on/off control valve 58 is operatively coupled to the electronic controller 26a for automatically controlling the on/off control valve 58 for selectively supplying the liquefied gas LG from the supply source 28.

The cryogenic storage system 10 further comprises a pressure build coil or a heat exchanger 60 that is disposed in the outlet line 34 downstream of the on/off control valve 42. The heat exchanger 60 is preferably configured to utilizes ambient air to warm the liquefied gas LG to vapor, which increases the pressure in the outlet line 34 downstream of the on/off control valve 42. A return line 62 branches off of the outlet line 34 to return the vapor back to the first cryogenic storage tank 12 when the liquefied gas LG of the second cryogenic storage tank 14 is not being dispensed.

The cryogenic storage system 10 further comprises an on/off control valve 64 disposed in the outlet line 34 downstream of the heat exchanger 60 and the return line 62. The on/off control valve 64 is pressure feedback controlled by a pressure controller 66. The pressure controller 66 opens the on/off control valve 64 when the pressure in the outlet line 34 downstream of the on/off control valve 64 falls below the predetermined pressure (e.g., 60 psig) of the second cryogenic storage tank 14. In particular, the outlet line 34 is fluidly connected to the top of the second cryogenic storage tank 14. Thus, when the liquefied gas LG of the second cryogenic storage tank 14 is to be dispensed, the pressure in the second cryogenic storage tank 14 will decrease. This decrease in pressure in the second cryogenic storage tank 14 will result in the on/off control valve 64 to open such that the higher pressure liquefied gas LG from the first cryogenic storage tank 12 will flow to the second cryogenic storage tank 14. Once the dispensing of the liquefied gas LG from the second cryogenic storage tank 14 is stopped, the higher pressure liquefied gas LG from the first cryogenic storage tank 12 will continue to flow until the pressure in the second cryogenic storage tank 14 reaches its predetermined (e.g., 60 psig) which will cause the on/off control valve 64 to close. Thus, the outlet line 34 downstream of the on/off control valve 64 has the pressure (e.g., 60 psig) of the second cryogenic storage tank 14. On the other hand, the outlet line 34 upstream of the on/off control valve 64 has the pressure (e.g., 80 psig) of the first cryogenic storage tank 12.

The second cryogenic storage tank 14 will now be discussed in more detail. The second cryogenic storage tank 14 has a top fill inlet line 70 and a bottom fill inlet/outlet line 72. The top fill inlet line 70 and the bottom fill inlet/outlet line 72 penetrate the top of the second cryogenic storage tank 14. Thus, the second cryogenic storage tank 14 does not includes a bottom penetration. The bottom fill inlet/outlet line 72 is fluidly connected to the first cryogenic storage tank 12 for refilling the first cryogenic storage tank 12 with the liquefied gas LG from the second cryogenic storage tank 14 after the completion of a dispensing operation.

With this arrangement, the second cryogenic storage tank 14 can be filled with the liquefied gas LG at a top region (upper half) of the second cryogenic storage tank 14 using the top fill inlet line 70, and a bottom region (lower half) of the second cryogenic storage tank 14 using the bottom fill inlet/outlet line 72. This top and bottom filling of the second cryogenic storage tank 14 with the liquefied gas LG promotes mixing of the liquefied gas LG in the second cryogenic storage tank 14. Also, the pressure of the liquefied gas LG in the second cryogenic storage tank 14 can be managed better by filling the second cryogenic storage tank 14 with the liquefied gas LG from both the top and bottom regions of the second cryogenic storage tank 14.

The top fill inlet line 70 is provided with an on/off control valve 74 for controlling the supply of the liquefied gas LG to the top region of the second cryogenic storage tank 14. Here, the top fill inlet line 70 is also provided with a spray bar 76 to promote mixing of the liquefied gas LG in the second cryogenic storage tank 14. Similarly, the bottom fill inlet/outlet line 72 is provided with an on/off control valve 78 for controlling the supply of the liquefied gas LG to the bottom region of the second cryogenic storage tank 14.

The on/off control valves 74 and 78 are operatively coupled to the electronic controller 26a for automatically controlling the on/off control valves 74 and 78 for dispensing and refilling the second cryogenic storage tank 14. The on/off control valve 78 is operatively coupled to the electronic controller 26a for automatically controlling the on/off control valve 78 to refill the first cryogenic storage tank 12 as needed. The on/off control valves 74 and 78 are conventional valves that can be either manually operated or automatically operated. Since on/off control valves such as the on/off control valves 74 and 78 are well known in the cryogenic field, the on/off control valves 74 and 78 will not be discussed and/or illustrated herein. For example, the on/off control valves 74 and 78 can be solenoid valve that are spring biased to a closed position, and then energized to an open position. Alternatively, the on/off control valves 74 and 78 can be pressure controlled, instead energized by electricity.

Also, the second cryogenic storage tank 14 also includes a liquid level detector 80. The liquid level detector 80 indicates a level of the liquefied gas LG within the second cryogenic storage tank 14. Preferably, when the liquid level detector 80 indicates that the second cryogenic storage tank 14 has been filled to a predetermined level (e.g., a 90% maximum capacity), this will be communicated to the electronic controller 26a which will cause the on/off control valves 74 and 78 to be closed during a filling process. Thus, the liquefied gas LG located within the second cryogenic storage tank 14 is now isolated at the predetermined pressure and temperature. The liquid level detector 80 is preferably a conventional device that is well known in the cryogenic field. Thus, the liquid level detector 80 will not be discussed and/or illustrated in detail herein. The liquid level detector 80 is operatively coupled to the electronic controller 26*a* for automatically controlling the on/off control valves 74 and 78 for refilling the second cryogenic storage tank 14.

Also, the second cryogenic storage tank 14 also includes a pressure safety valve 82 that is configured to release pressure inside of the second cryogenic storage tank 14 in the event of the pressure becoming higher than a predetermined maximum pressure. Basically, the pressure safety valve 82 is a pressure relief valve that vents out the vapor in the second cryogenic storage tank 14 in the event of the pressure becoming higher than the predetermined maximum pressure. Since pressure safety valves such as the pressure safety valve 82 is well known in the cryogenic field, the pressure safety valve 82 will not be discussed and/or illustrated herein.

Also, the second cryogenic storage tank 14 also includes a boil off valve 84 that is pressure feedback controlled by a pressure controller 86. Since the boil off valve 84 such as the boil off valve is well known in the cryogenic field, the boil off valve 84 will not be discussed and/or illustrated herein.

Now an overall operation of the cryogenic storage system 10 will be explained. Normally, the first cryogenic storage tank 12 will be filled to a maximum fill level (90% of the first predetermined capacity) of the first cryogenic storage tank 12 as determined by the liquid level detector 46. The first cryogenic storage tank 12 can be filled or refilled with the liquefied gas LG from the second cryogenic storage tank 14 or from the supply source 28 (e.g., an onsite liquefaction system and/or a LG transport).

In the case of the first cryogenic storage tank 12 being filled or refilled with the liquefied gas LG from the supply source 28, the on/off control valve 58 is opened to allow the liquefied gas LG from the supply source 28 to enter the infeed line 56. The on/off control valves 36 and 38 are also opened so that the liquefied gas LG from the supply source 28 can enter the first cryogenic storage tank 12. The external compressor 54 will increase the pressure of the liquefied gas LG from the supply source 28 to the desired operating pressure for the first cryogenic storage tank 12. The liquefied gas LG from the supply source 28 will continue to fill the first cryogenic storage tank 12 until the liquid level detector 46 detects the first cryogenic storage tank 12 has been filled to the predetermined level (e.g., a 90% maximum capacity). After the first cryogenic storage tank 12 has been filled to the predetermined level, the on/off control valves 36 and 38 are automatically closed by the electronic controller 26*a*. The on/off control valves 36 and 38 are normally closed when the first cryogenic storage tank 12 is not belling filled.

The second cryogenic storage tank 14 is with the liquefied gas LG from the supply source 28 by opening the on/off control valves 58, 74 and 78. The liquefied gas LG from the supply source 28 will continue to fill the second cryogenic storage tank 14 until the liquid level detector 80 detects the second cryogenic storage tank 14 has been filled to the predetermined level (e.g., a 90% maximum capacity). After the second cryogenic storage tank 14 has been filled to the predetermined level, the on/off control valves 74 and 78 are automatically closed by the electronic controller 26*a*. The on/off control valves 74 and 78 are normally closed when the second cryogenic storage tank 14 is not belling filled.

When vaporization or liquid sales are to be performed, a user operates the operator terminal 26 of the cryogenic storage system 10 to open the on/off control valves 78 and 90 are opened to allow liquefied gas LG to flow from the bottom of the second cryogenic storage tank 14 to the vaporizer or liquid customer 92 being filled. As a result of the opening of the on/off control valves 78 and 90, the pressure in the second cryogenic storage tank 14 will drop. The drop in the pressure in the second cryogenic storage tank 14 will be detected by the pressure controller 66, which in turn will open the on/off control valve 64. The opening of the on/off control valve 64 will cause the higher pressure liquefied gas LG from the first cryogenic storage tank 12 will flow to the second cryogenic storage tank 14. Since the first cryogenic storage tank 12 is higher in pressure than the second cryogenic storage tank 14, the vapor coming from the first cryogenic storage tank 12 will push the liquefied gas LG of the first cryogenic storage tank 12 out of the bottom fill inlet/outlet line 72 to the vaporizer or the liquid customer 92.

Figure 2:
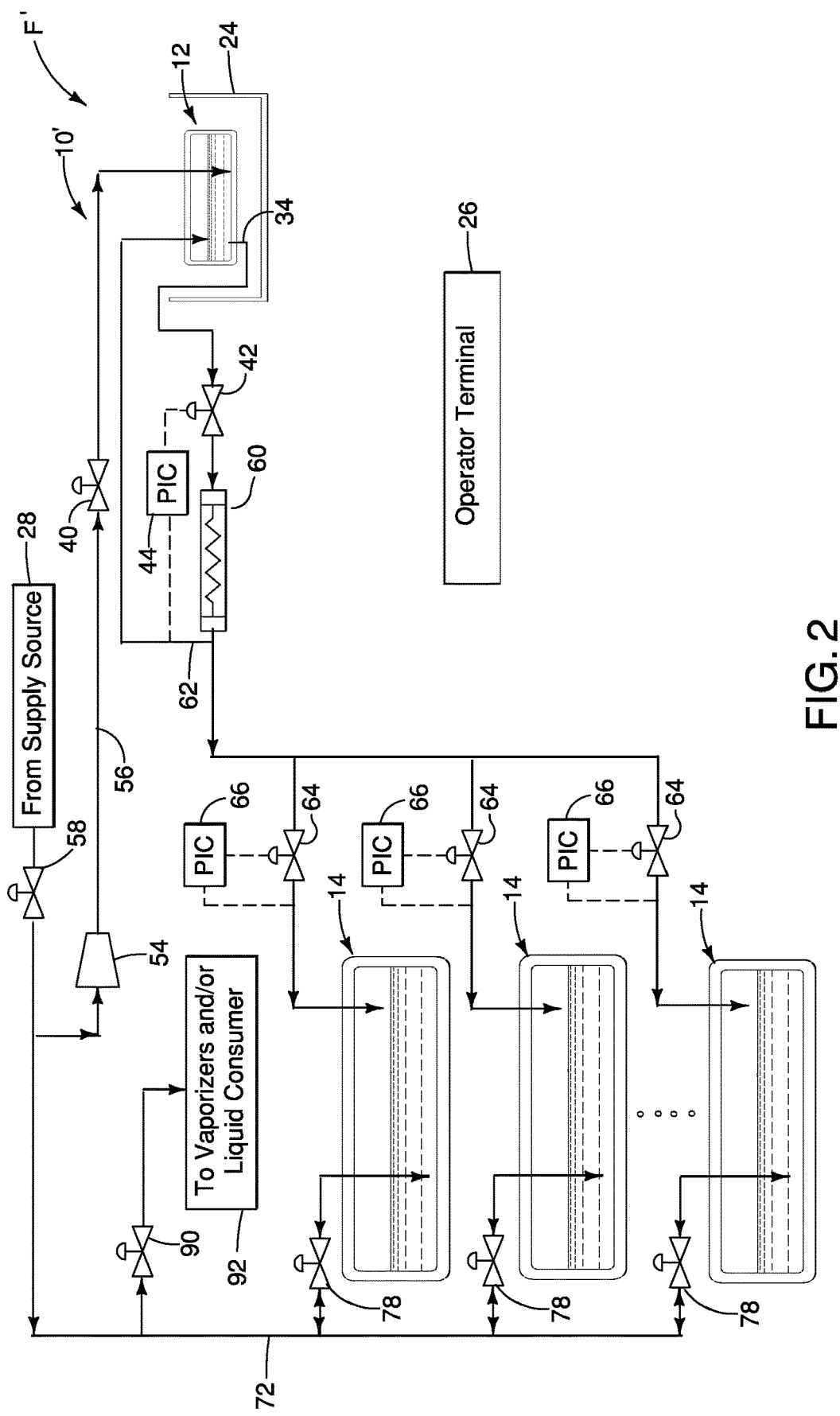
FIG. 2 is a schematic illustration of a cryogenic storage facility having cryogenic storage system in accordance with a second embodiment.

Referring now to FIG. 2, a cryogenic storage facility F' having a cryogenic storage system 10' in accordance with a second embodiment will now be explained. The cryogenic storage facility F' is basically the same as the cryogenic storage facility F discussed above, except that the cryogenic storage system 10' has a plurality of the second cryogenic storage tank 14 which utilize the same first cryogenic storage tank 12 as a sacrificial tank for providing a motive force to move the liquefied gas LG out of the second cryogenic storage tanks 14.

While some of the component of the cryogenic storage system 10 are not illustrated in the cryogenic storage system 10', it will be apparent to those skilled in the cryogenic field that the other components of the cryogenic storage system 10 are includes in the cryogenic storage system 10'. In other words, various components of the illustration of the cryogenic storage system 10' have been omitted for the sake of brevity. The operation of the cryogenic storage system 10' is basically the same as discussed above with respect to the cryogenic storage system 10. However, here, each of the second cryogenic storage tanks 14 is fluidly connected to the outlet line 34 (i.e., the fluid transfer line) of the first cryogenic storage tank 12. Thus, the higher pressure of the first cryogenic storage tank 12 can be used as a motive force to move the liquefied gas LG out of each of the second cryogenic storage tanks 14. The number and capacity of the second cryogenic storage tanks 14 is not limited.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used in this disclosure means "either one or both of".

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A cryogenic storage system comprising:
   a first cryogenic storage tank having a first predetermined capacity of liquefied gas;
   a second cryogenic storage tank having a penetration free bottom and a second predetermined capacity of the liquefied gas that is larger than the first predetermined capacity of the first cryogenic storage tank;
   a first outlet line fluidly connected to a bottom of the first cryogenic storage tank and fluidly connected to an upper portion of the second cryogenic storage tank at a point of the upper portion that is above a level of the liquefied gas within the second cryogenic storage tank for removing the liquefied gas from the first cryogenic storage tank, the first outlet line including at least one control valve to regulate the flow of the liquefied gas from the first cryogenic storage tank to the second cryogenic storage tank;
   a second outlet line connected to the upper portion of the second cryogenic storage tank at a point above the level of the liquefied gas within the second cryogenic storage tank and extending into the second cryogenic storage tank through the upper portion to a point below the level of the liquefied gas within the second cryogenic storage tank for dispensing the liquefied gas from the second cryogenic storage tank through the upper portion of the second cryogenic storage tank; and
   a cryogenic containment structure positioned to contain spillage of liquefied gas from the first cryogenic storage tank;
   the second cryogenic storage tank including an inner container having a penetration free bottom and an outer container having a penetration free bottom;
   the first cryogenic storage tank containing the liquefied gas at a higher pressure than a pressure of the liquefied gas contained in the second cryogenic storage tank such that the liquefied gas exiting the first cryogenic storage tank is used as a motive force to move the liquefied gas out of the second cryogenic storage tank through the upper portion of the second cryogenic storage tank via the second outlet line without using an internal pump.

2. The cryogenic storage system according to claim 1, wherein
   the cryogenic containment structure has a containment capacity that is equal to or greater than the first predetermined capacity of the first cryogenic storage tank.

3. The cryogenic storage system according to claim 1, wherein
   the cryogenic containment structure has a containment capacity that is at least 110% of the first predetermined capacity of the first cryogenic storage tank.

4. The cryogenic storage system according to claim 1, further comprising
   a heat exchanger operatively coupled to the first outlet line between the first cryogenic storage tank and the second cryogenic storage tank to convert the liquefied gas exiting the first cryogenic storage tank to a higher pressure gas.

5. The cryogenic storage system according to claim 4, wherein
   the first outlet line is also fluidly connected to the first cryogenic storage tank by a return line that is downstream of the heat exchanger, and
   the at least one control valve includes a first control valve that is located upstream of the heat exchanger, and that opens upon pressure in the return line dropping below a predetermined pressure.

6. The cryogenic storage system according to claim 5, wherein
   the at least one control valve includes a second control valve that is located downstream of the heat exchanger, and that opens upon pressure in the first outlet line downstream of the second control valve dropping below a predetermined pressure.

7. The cryogenic storage system according to claim 4, wherein
   the at least one control valve includes a control valve that is located downstream of the heat exchanger, and that opens upon pressure in the first outlet line downstream of the control valve dropping below a predetermined pressure.

8. The cryogenic storage system according to claim 4, wherein
   the heat exchanger is a pressure build coil.

9. The cryogenic storage system according to claim 1, wherein
   the second cryogenic storage tank is not provided with a cryogenic containment structure capable of containing spillage of the liquefied gas from the second cryogenic storage tank that is equal to or greater than 90% of the second predetermined capacity of the second cryogenic storage tank.

10. The cryogenic storage system according to claim 1, further comprising
    additional cryogenic storage tanks having penetration free bottoms and predetermined capacities of the liquefied gas that are larger than the first predetermined capacity of the first cryogenic storage tank, and fluid transfer line fluidly connecting the first cryogenic storage tank to the second cryogenic storage tank, the fluid transfer line including at least one control valve to regulate the flow of the liquefied gas from the first cryogenic storage tank to the second cryogenic storage tank.

11. A cryogenic storage system comprising:

a first cryogenic storage tank having a first predetermined capacity of liquefied gas;

a second cryogenic storage tank having a penetration free bottom and a second predetermined capacity of the liquefied gas that is larger than the first predetermined capacity of the first cryogenic storage tank;

a first outlet line fluidly connected to a bottom of the first cryogenic storage tank and fluidly connected to an upper portion of the second cryogenic storage tank at a point of the upper portion that is above a level of the liquefied gas within the second cryogenic storage tank for removing the liquefied gas from the first cryogenic storage tank, the first outlet line including at least one control valve to regulate the flow of the liquefied gas from the first cryogenic storage tank to the second cryogenic storage tank;

a second outlet line connected to the upper portion of the second cryogenic storage tank at a point above the level of the liquefied gas within the second cryogenic storage tank and extending into the second cryogenic storage tank through the upper portion to a point below the level of the liquefied gas within the second cryogenic storage tank for dispensing the liquefied gas from the second cryogenic storage tank through the upper portion of the second cryogenic storage tank;

a heat exchanger operatively coupled to the first outlet line between the first cryogenic storage tank and the second cryogenic storage tank to convert liquid exiting the first cryogenic storage tank to a higher pressure gas that is used as a motive force to move the liquefied gas out of the second cryogenic storage via the second outlet line without using an internal pump; and a cryogenic containment structure positioned to contain spillage of the liquefied gas from the first cryogenic storage tank;

the second cryogenic storage tank including an inner container having a penetration free bottom and an outer container having a penetration free bottom.

12. The cryogenic storage system according to claim 11, wherein the fluid transfer line is fluidly connected to the first cryogenic storage tank by a return line that is downstream of the heat exchanger, and the at least one control valve includes a first control valve that is located upstream of the heat exchanger, and that opens upon pressure in the return line dropping below a predetermined pressure.

13. The cryogenic storage system according to claim 12, wherein the at least one control valve includes a second control valve that is located downstream of the heat exchanger, and that opens upon pressure in the fluid transfer line downstream of the second control valve dropping below a predetermined pressure.

14. The cryogenic storage system according to claim 13, wherein the at least one control valve includes a third control valve that is located downstream of the heat exchanger, and that opens upon pressure in the fluid transfer line downstream of the control valve dropping below a predetermined pressure.

15. The cryogenic storage system according to claim 11, wherein the heat exchanger is a pressure build coil.

16. The cryogenic storage system according to claim 11, wherein the first cryogenic storage tank is fluidly connected to the second cryogenic storage tank via the second outlet line to convey the liquefied gas from the second cryogenic storage tank to the first cryogenic storage tank, the second outlet line includes at least one control valve to regulate the flow of the liquefied gas from the second cryogenic storage tank to the first cryogenic storage tank.

17. The cryogenic storage system according to claim 16, wherein the second outlet line is fluidly connected to a top fill inlet line arranged in the first cryogenic storage tank for supplying the liquefied gas to a top region of the first cryogenic storage tank, and a bottom fill inlet line arranged in the first cryogenic storage tank for supplying the liquefied gas to a bottom region of the first cryogenic storage tank.

18. The cryogenic storage system according to claim 1, wherein the first cryogenic storage tank is fluidly connected to the second cryogenic storage tank via the second outlet line to convey the liquefied gas from the second cryogenic storage tank to the first cryogenic storage tank, the second outlet line includes at least one control valve to regulate the flow of the liquefied gas from the second cryogenic storage tank to the first cryogenic storage tank.

19. The cryogenic storage system according to claim 16, wherein the second outlet line is fluidly connected to a top fill inlet line arranged in the first cryogenic storage tank for supplying the liquefied gas to a top region of the first cryogenic storage tank, and a bottom fill inlet line arranged in the first cryogenic storage tank for supplying the liquefied gas to a bottom region of the first cryogenic storage tank.

\* \* \* \* \*